Nov. 14, 1961   JEAN-PAUL BRUNOT   3,008,342
GEAR BOX AND CONTROL DEVICE THEREFOR
Filed July 15, 1959   2 Sheets-Sheet 2
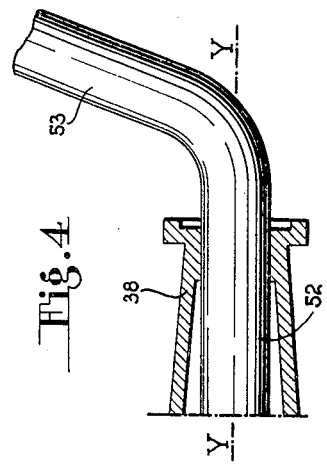
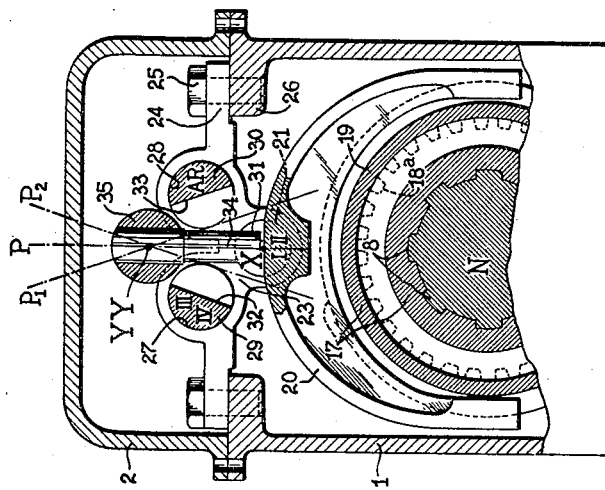
Inventor
Jean-Paul BRUNOT
by J. Delattre-deguy
Attorney 3,008,342
GEAR BOX AND CONTROL DEVICE
THEREFOR
Jean-Paul Brunet, Sens, France, assignor to Compagnie de Pont-A-Mousson, Nancy (Meurthe-et-Moselle), France, a body corporate of France
Filed July 15, 1959, Ser. No. 827,325
Claims priority, application France July 16, 1958
5 Claims. (Cl. 74—473)

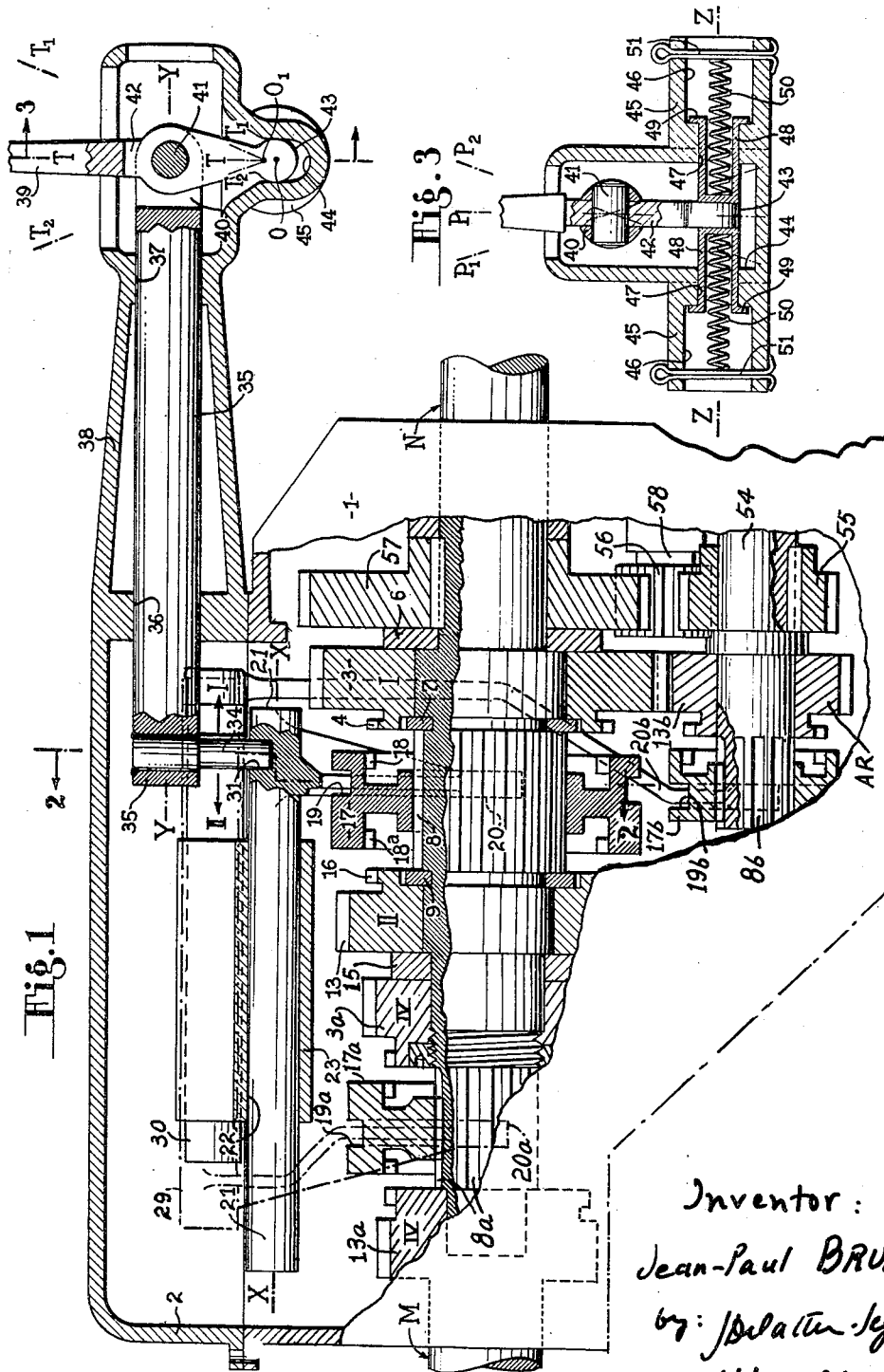

The present invention relates to manual control devices for change gear mechanisms or gear boxes for vehicles driven by a variable torque engine of the type having sliding clutch or other connection elements in which each of the speeds is engaged by the displacement in a given direction of a pre-selected sliding clutch or other connection element.

Gear boxes of this type have a control device which generally includes a ball and socket lever which is operated by the driver and permits selecting from outside the gear box one of several actuating elements pertaining to the shifting of the sliding clutch elements so as to shift the corresponding sliding clutch element in the desired direction. These actuating elements, three of which are for example provided in a gear box having four speeds and reverse, are generally in the form of straight rods or slides of great length, since they constitute a connection between the gear shift lever located in the driving compartment and the gear box, which is sometimes remote from this compartment in particular when it is placed in front of the latter. Thus it is necessary to provide guide bearings arranged along the length of each rod, at least three of them being provided. The machining and lining up of these bearings is particularly difficult owing to the distance therebetween and their number. The rods are generally carried by the cover or the gear box case which renders their mounting both complicated and more difficult.

Further, the spherical or ball and socket mounting of the gear shift lever is difficult to machine and its wear in service is difficult to compensate. Play is inevitable and is manifested in the driving compartment by a looseness of the gear shift lever and vibrational noise transmitted to the lever by the engine and the gear box.

Further, the mounting of a female sphere on a male sphere to obtain the spherical mounting requires special constructional precautions which render this construction more complicated.

The object of the invention is to provide a manual control device for gear boxes of the aforementioned type which is simplified and avoids all the aforementioned drawbacks. This control device comprises a main rod which is capable of being turned about and slid along its axis for the purpose of selecting and shifting, by means of an operating pin rigid with one of the ends of the rod, slides parallel with the rod and adapted to shift the sliding clutch or other connection elements of the gear box, the other end of the rod being permanently and directly connected to the gear shift lever.

With this arrangement, the selection of the gear shifting slides is effected not directly by the gear shift lever but by the main single rod to which this lever is connected. Thus it is possible considerably to reduce the length of the slides and to house them wholly in the gear box, only the main rod extending out of the latter for its connection to the gear shift lever.

Another object of the invention is to provide a gear box including the aforementioned control device, and in particular a gear box in which the slides are wholly housed in the gear box under the cover of the latter and are selectively connected to the gear shift lever by the main single rod which is journalled and slidable in said cover and extends out of the latter.

Further features and advantages of the invention will be apparent from the ensuing description with reference to the accompanying drawings, to which the invention is in no way limited.

In the drawings:

FIG. 1 is an elevational view, with parts in section, of a portion of a gear box and its control device improved in accordance with the invention;

FIGS. 2 and 3 are sectional views taken along lines 2—2 and 3—3 of FIG. 1, and

FIG. 4 is a partial sectional view similar to FIG. 1 of a modification of the invention.

In the embodiment shown in FIGS. 1 to 3, the invention is applied to a change gear mechanism or gear box adapted to transmit with a certain speed reduction the rotary motion of a driving shaft M (FIG. 1) to a driven shaft N, both shafts being journalled in bearings (not shown in the drawings) carried by a gear box case 1. The case 1 is closed at its upper part by a cover 2.

In the interest of clarity, the gear box shown in FIG. 1 has been broken away so as to show diagrammatically the gears for first (I), second (II), third (III) and fourth (IV) speeds and reverse (AR), their engaging mechanism and the actuating device for the latter.

Freely rotative on the driven shaft N is a gear 3 for the first speed (I); this gear comprises an additional toothing 4 constituting a dog clutch element 4. The gear 3 is rigid as concerns axial motion on the shaft N between two abutment collars 6 and 7. This shaft N comprises splines 8 for mounting the engaging device of the first speed (I) and second speed (II) described hereinafter. The gear 13 for the second speed (II) is freely rotative on the shaft N and prevented from axial movement thereby by two abutment collars 9 and 15. It also comprises an additional toothing constituting a dog clutch element identical to the element 4.

The engaging device for the first (I) and second (II) speeds comprises a sliding clutch or connection element 17 mounted on the splines 8 of the shaft N between the gears 3 and 13 which is permanently driven by driving shaft M in the usual manner. Sliding clutch element 17 is prevented from rotation on the shaft N and is slidable along the splines 8. It comprises two internal teeth 18 and 18$^a$ adapted to engage respectively with the dog clutch elements 4 and 16, the engagement of one of the pairs of the toothing necessitating the disengagement of the other pair. The sliding clutch element 17 is provided with an annular recess 19 (FIGS. 1 and 2) in which is located a shifting fork 20 rigid with a slide 21.

The engaging device for the third (III) and fourth (IV) speeds comprises, in a similar manner, a sliding clutch or connection element 17$^a$ mounted slidingly on splines 8$^a$ of shaft N between gears 3$^a$ and 13$^a$ for the third (III) and fourth (IV) speeds respectively, which are freely rotative and rotate permanently. Sliding clutch element 17$^a$ is provided with an annular recess 19$^a$ which is engaged by a fork 20$^a$.

In a similar manner, the engaging device for reverse (AR) comprises, on an auxiliary shaft 54 since the direction of reverse is opposite to that of the forward speeds, a sliding clutch or connection element 17$^b$ mounted slidingly on splines 8$^b$ of shaft 54 and adapted to engage a gear 13$^b$, freely rotative on said shaft and in mesh with gear 3. Shaft 54 is connected with shaft N by the usual gear train having three elements 55, 56 and 57, keyed respectively on shaft 54, on an auxiliary fixed pin 58 and on shaft N. Sliding clutch element 17$^b$ is provided with an annular recess 19$^b$ which is engaged by a fork 20$^b$.

According to the invention, the forks 20, 20$^a$ and 20$^b$ are preferably of spheroidal graphite cast iron. Fork 20 is cast in one piece with a slide 21. The latter is slidably mounted within the case 1 in a bore 22, having an axis X—X, of a sleeve 23 provided with ears 24 (FIG. 2) fixed by bolts 25 to inner lugs 26 provided in the upper part of the case 1. The sleeve 23 also comprises two other bores 27 and 28 which are parallel with and located on either side of the bore 22, these bores 27 and 28 being at equal distances from bore 22. Slidably mounted in the bores 27 and 28 are slides 29 and 30 similar to the slide 21 and with which are cast in one piece, on the one hand, fork 20$^a$ of the third (III) and fourth (IV) speeds and on the other hand, fork 20$^b$ of the reverse speed (AR). The slides 21, 29 and 30 are provided with the recesses 31, 32 and 33, the latter two recesses being symmetrically disposed relative to a vertical plane P containing the axis X—X of the slide 21 (FIG. 2).

Co-acting with these recesses 31, 32 and 33 in the slides is a single operating pin 34 which is radially disposed and carried by the end of a main rod 35 parallel with the three slides, the axis Y—Y of this rod being in the vertical plane P. The rod 35 is therefore at an equal distance from each of the slides 29 and 30 so that when this rod is turned about its axis Y—Y through the maximum amplitude (shown in FIG. 2 by the lines of the inclined planes P$^1$ and P$^2$ which are symmetrical relative to the vertical mean plane P), the pin 34 is capable of engaging one of the recesses 29 and 30. In FIGS. 1 and 2, the pin 34 is shown in its mean position in the plane P engaged in the recess 31 of the slide 21.

The main rod 35 is slidably mounted and journalled in two bores 36 and 37 provided in an outer extension member 38 of the cover 2 of the case 1. The other end of the rod 35, that is, the end remote from the pin 34, is connected to a gear shift lever 39 controlled by the driver in the driving compartment. To this end, the rod 35 terminates in a fork 40 (FIGS. 1 and 3) through which extends a pivot pin 41 perpendicular to the axis Y—Y, this pin also extending through a flattened part 42 of the lever 39 which is slidably mounted between the branches of this fork. The end of the flattened part 42 terminates in a circular shaped portion 43 having a centre O and is located in a recess 44 which extends in a direction perpendicular to the plane P, has a substantially rectangular cross-section and is formed in the support 38.

The recess 44 has a width equal to the diameter of the circular portion 43 (FIG. 1) and such length as to permit the flattened end of the lever pivotal movements about the axis Y—Y (FIG. 3) of maximum amplitude permitting shifting the axis of the pin 34 from the plane P$^1$ to the plane P$^2$ and inversely. The recess 34 is also deep enough to permit the end 42 to move slightly in vertical translation, that is, in the direction of the depth of the recess 44 in the course of the pivotal movements of the lever 39 in the plane P about an axis intersecting the point O, the maximum amplitude of these pivotal movements being represented by the axis T$_1$—T$_1$ and T$_2$—T$_2$ which are symmetrical relative to the mean axis T—T (FIG. 1).

The support member 38 of the rod 35 also includes, at its end in line with the recess 44, two lateral bosses 45 having an axis Z—Z perpendicular to the plane P. Each of these bosses comprises a chamber 46 communicating with the end of the recess 44 by way of a cylindrical aperture 47 on the axis Z—Z in which is slidably mounted a piston 48 which terminates in the form of a flange 49 adapted to bear against the shoulder formed between the chamber 46 and the aperture 47. The length of the piston is such that when the flange 49 bears against said shoulder, the head of the piston is in contact with the flattened end 42 of the lever 39 and maintains the latter in its mean position in plane P. Each of the pistons 48 is biased by the opposing actions of the end 42 of the lever 39 pivotable about the axis Y—Y, and a spring 50 which bears against a split pin 51 extending through the boss 45.

The control device of the invention operates in the following manner:

When the driver turns the gear shift lever 39 (FIGS. 2 and 3) about the axis Y—Y in the plane T—T (plane of FIG. 3) in order to bring the lever 39 into one of the planes P, P$_1$, or P$_2$, the lever 39 rotates the rod 35, through the medium of its flattened end 42 co-operating with the fork 40, in such manner as to place the operating pin 34 in one of the recesses 31, 32 and 33. The lever 39 is guided in this pivotal motion indirectly by the bores 36 and 37 in which the main rod 35 is journalled, the lever 39 being connected to this rod, and directly by the recess 34 which guides the end 42 owing to the circular profile 43. This pivotal movement occurs in opposition to the action of one of the springs 50 compressed by the piston 48 against which the end 42 exerts pressure.

When the driver turns the lever 39 about the axis perpendicular to the plane P and intersecting the center O of the end 43, the lever 39 turns in the plane P (FIG. 1), for example in the direction for shifting the lever from the position of axis T—T to the position of axis T$_2$—T$_2$, the circular profile 43 bearing against the recess 44 and the lever being guided by the fork 40 and the bores 36 and 37. In the course of this movement the lever 39 shifts the rod 35 in the direction of arrow II (FIG. 1) through the medium of the pin 41 and in consequence the slide 21 and the sliding clutch element 17 are shifted in the same direction.

In the course of this operation, the pin 41 is moved along the axis Y—Y owing to the aligned bores 36 and 37 guiding the rod 35. Thus the end 42 which is free to move in the recess 44 moves upwardly until the centre O of the profile 43 assumes the position O$^1$ at which the axes T$_1$—T$_1$ and T$_2$—T$_2$ intersect.

The lever 39 also turns under the same conditions as the preceding conditions in the planes P$_1$ and P$_2$ about an axis intersecting the centre O of the profile 43.

It will be understood that the actuating device of the gear box is maintained in each of the positions selected by the driver by locking means known per se and not shown in the drawings.

It can be seen that according to the invention the connection between the gear shift lever and the actuating slides shifting the sliding clutch elements is through the medium of the main rod 35 guided by the support 38.

Thus there is, firstly, a lightening of this support 38 and of the cover 2.

Also, the position of the pin 34 at the end of the rod 35 within the gear box permits reducing the length of the three slides 21, 29 and 30 and disposing them within the case 1. Thus, a single bore 22, 27 and 28 easy to machine is sufficient for guiding each of the slides. Owing to the fact that each of the bores 22, 27 and 28 are formed in the same member 23 which is easily fixed to the case 1 by means of the bolts 25 after having removed the cover 2, their machining is particularly easy.

Further, the guiding of the slides in their middle parts by means of the single member 23 permits constructing the slides and the forks in a single piece (such as the piece 20, 21). This construction is economical, since any articulation and clamping screw for the fork on the slide is eliminated because this fork can be connected to the slide by casting. This construction is also robust owing to the use of spheroidal graphite cast iron.

Further, the mounting of the lever 39 in the rod 35 ensures a precise guiding of the movements of the lever. Thus, at each instant the pivotal mounting of the lever 39 on the rod 35 is guided by the bores 36 and 37, whereas the flat end 42 is maintained without play and can even be gripped by the pistons 48 under the action of the springs 50. The lever 39 is therefore not subjected to any vibration and is not a source of noise in the driving compartment as is the case with ball and socket type gear shift levers.

Finally, the mounting of the control device is considerably simplified. Thus, after having removed the cover 2 the simultaneous positioning of the member 23 and the three slides is easy owing to the ease of access. The forks, such as the fork 20, are placed in the recesses, such as the recess 19, of the corresponding sliding clutch elements and no adjustment is necessary. The same is true for the mounting of the cover 2 and the rod 35 which is previously mounted in the bores 36 and 37.

To summarize, owing to the invention the control device controlling the change speed mechanism is simplified in construction, more robust, more precise and more easily mounted.

In the modification shown in FIG. 4, the rod 35 is replaced by a similar rod 52 which is cranked at its outer end so as to constitute a gear shift lever 53.

Although specific embodiments of the invention have been described, many modifications and changes may be made therein without departing from the scope of the invention as defined in the appended claims.

Thus the end of the rod 35 outside the gear box instead of being provided with a fork 40, could be flattened so as to be engaged in a corresponding recess formed in the gear shift lever and connected to the latter by the pivot pin 41.

Having now described my invention what I claim as new and desire to secure by Letters Patent is:

1. In a change-speed gear box, in combination: a casing having an upper wall; a large plane aperture in said upper wall; a detachable lid for closing said aperture; a plurality of shafts mounted for rotation in said casing; gears mounted idle on at least one of said shafts; sliding connection elements within said casing and adapted to connect for rotation each of said idle gears individually to its shaft; slides for said sliding connection elements within said casing; across said aperture, under said lid, a detachable transverse guiding sleeve; a plurality of guiding bores extending throughout said sleeve, said bores being parallel to each other and to the plane of said aperture; means for connecting detachably said sleeve to said casing; a plurality of actuating means for said sliding connection elements, each of said actuating means comprising: a slide slidably mounted in one of said bores, said slide projecting out of said bore by at least one of its ends and by an overhanging portion adjacent said end, and a shifting fork for each of said sliding connection elements, said shifting fork being rigid with said overhanging portion.

2. A gear box as claimed in claim 1, in which said shifting fork is integral with said overhanging portion.

3. A gear box as claimed in claim 1, in which each slide and its dependent shifting fork are composed of spheroidal graphite cast iron.

4. In a change-speed gear box, in combination: a casing having an upper wall; a plurality of shafts mounted for rotation in said casing; gears mounted idle on at least one of said shafts in said casing; sliding connection elements movable within said casing and adapted to connect for rotation each of said idle gears individually to its shaft; in said upper wall, a large plane substantially rectangular aperture; inwardly projecting lugs along at least a portion of the longitudinal sides of said aperture; a detachable lid to close said aperture; across said aperture, a detachable transverse guiding sleeve resting on said lugs; means for attaching said guiding sleeve detachably to said lugs; a plurality of guiding bores extending throughout said guiding sleeve and parallel to said lugs; for each of said sliding connection elements, an actuating device comprising: a slide slidably mounted in one of said bores and projecting out of said bore by at least one of its ends and by an overhanging portion adjacent said end, and a shifting fork rigid and integral with said overhanging portion.

5. In a change-speed gear box, in combination: a casing having an upper wall; in said upper wall, a large plane rectangular aperture; a detachable cover for said aperture; within said casing, several shafts, gears mounted idle on said shafts, and movable sliding clutch elements for actuating said idle gears by connection of each of them individually with the corresponding shaft; across said aperture, a detachable transverse guiding sleeve; a plurality of guiding bores extending throughout said guiding sleeve and parallel to the long sides of said aperture; means for connecting said guiding sleeve removably to said casing; for each of said sliding clutch elements, a monobloc actuating device comprising a slide element slidingly mounted in one of said guiding bores and a shifting fork connected rigidly and integrally with said slide element near one end portion thereof and outside said guiding sleeve; a single operating lever movable on said cover outside the latter; inside said cover and carried by it, selective connecting means between said lever and said slide elements for allowing said lever to be connected at will and individually to one of said slide elements to move it axially by sliding into the corersponding bore of said guiding sleeve.

References Cited in the file of this patent

UNITED STATES PATENTS

| | | |
|---|---|---|
| 1,331,685 | Umsted | Feb. 24, 1920 |
| 1,881,843 | Morley et al. | Oct. 11, 1932 |
| 2,252,158 | Bixby | Aug. 12, 1941 |
| 2,694,943 | Brumbaugh | Nov. 23, 1954 |